US009663728B2

(12) United States Patent
Venkataraman et al.

(10) Patent No.: US 9,663,728 B2
(45) Date of Patent: May 30, 2017

(54) GROUP 13-15 INTERSTITIAL METAL HYDRIDE CATALYSTS AND ASSOCIATED PROCESSES

(71) Applicants: Pallassana S. Venkataraman, Annandale, VA (US); Gordon F. Stuntz, Baton Rouge, LA (US); Jonathan Martin McConnachie, Annadale, NJ (US); Faiz Pourarian, Wexford, PA (US)

(72) Inventors: Pallassana S. Venkataraman, Annandale, VA (US); Gordon F. Stuntz, Baton Rouge, LA (US); Jonathan Martin McConnachie, Annadale, NJ (US); Faiz Pourarian, Wexford, PA (US)

(73) Assignee: EXXONMOBILE RESEARCH AND ENGINEERING COMPANY, Annandale, NJ (US)

( * ) Notice: Subject to any disclaimer, the term of this patent is extended or adjusted under 35 U.S.C. 154(b) by 176 days.

(21) Appl. No.: 14/525,477

(22) Filed: Oct. 28, 2014

(65) Prior Publication Data
US 2015/0045600 A1 Feb. 12, 2015

Related U.S. Application Data

(62) Division of application No. 12/948,312, filed on Nov. 17, 2010, now abandoned.

(60) Provisional application No. 61/281,964, filed on Nov. 24, 2009.

(51) Int. Cl.
| | |
|---|---|
| *B01J 21/06* | (2006.01) |
| *B01J 21/08* | (2006.01) |
| *B01J 29/076* | (2006.01) |
| *C10G 45/00* | (2006.01) |
| *C10G 45/22* | (2006.01) |
| *C10L 1/00* | (2006.01) |
| *C10G 49/04* | (2006.01) |
| *B01J 31/12* | (2006.01) |
| *C10G 45/60* | (2006.01) |
| *C10G 47/02* | (2006.01) |
| *C10G 1/00* | (2006.01) |
| *C10G 45/04* | (2006.01) |
| *C10G 45/06* | (2006.01) |
| *C10G 49/02* | (2006.01) |

(52) U.S. Cl.
CPC ............ *C10G 49/04* (2013.01); *B01J 31/121* (2013.01); *C10G 1/002* (2013.01); *C10G 45/04* (2013.01); *C10G 45/06* (2013.01); *C10G 45/60* (2013.01); *C10G 47/02* (2013.01); *C10G 49/02* (2013.01); *B01J 2231/64* (2013.01); *B01J 2531/0222* (2013.01); *B01J 2531/42* (2013.01); *B01J 2531/48* (2013.01); *B01J 2531/52* (2013.01); *B01J 2531/56* (2013.01); *C10G 2300/1011* (2013.01); *Y02E 50/13* (2013.01); *Y02P 30/20* (2015.11)

(58) Field of Classification Search
None
See application file for complete search history.

(56) References Cited

U.S. PATENT DOCUMENTS

| | | |
|---|---|---|
| 2,881,131 A | 4/1959 | Kearby |
| 3,736,265 A | 5/1973 | Suggitt |
| 3,758,614 A | 9/1973 | Mertzweiller et al. |
| 4,025,606 A | 5/1977 | Acres |
| 4,040,410 A | 8/1977 | Libowitz |
| 4,120,763 A | 10/1978 | Breda et al. |
| RE30,083 E | 8/1979 | Reilly et al. |
| 4,279,722 A | 7/1981 | Kirkbride |
| 4,302,436 A | 11/1981 | Sirovich et al. |
| 4,545,879 A | 10/1985 | Wan et al. |
| 4,556,551 A | 12/1985 | Wallace et al. |
| 4,560,816 A | 12/1985 | Davis, Jr. |
| 5,286,698 A | 2/1994 | Carberry et al. |
| 5,332,705 A | 7/1994 | Huang et al. |
| 5,525,435 A | 6/1996 | Pourarian |
| 5,695,530 A | 12/1997 | Hong et al. |
| 6,017,845 A | 1/2000 | Ovalles et al. |
| 6,171,479 B1 | 1/2001 | Ovalles et al. |
| 6,403,523 B1 | 6/2002 | Cantrell et al. |
| 6,670,490 B1 | 12/2003 | Campos et al. |
| 6,680,042 B1 | 1/2004 | Schulz et al. |
| 7,157,401 B2 | 1/2007 | Purta et al. |
| 7,387,712 B2 | 6/2008 | Purta et al. |
| 7,455,927 B2 | 11/2008 | DiSalvo, Jr. et al. |
| 7,601,329 B2 | 10/2009 | Vajo et al. |
| 2002/0013221 A1 | 1/2002 | Thompson et al. |

(Continued)

OTHER PUBLICATIONS

Leadbeater. Nicholas E, and Khan, Rashid M., "Microwave-Promoted Desulfurization of Heavy and Sulfur-Containing Crude Oil", Energy & Fuels (2008), 22(3), 1838-1839, abstract.

(Continued)

*Primary Examiner* — Colin W Slifka
(74) *Attorney, Agent, or Firm* — Chad A. Guice

(57) ABSTRACT

The present invention relates to the processing of hydrocarbon-containing feedstreams in the presence of an interstitial metal hydride comprised of at least one chemical element selected from Groups 3-11 (including the lanthanides, atomic numbers 58 to 71), and at least one chemical element selected from Groups 13-15 from the IUPAC Periodic Table of Elements. These interstitial metal hydrides, their catalysts and processes using these interstitial metal hydrides and catalysts of the present invention improve overall hydrogenation, product conversion, as well as sulfur reduction in hydrocarbon feedstreams.

23 Claims, No Drawings

(56) References Cited

U.S. PATENT DOCUMENTS

| | | |
|---|---|---|
| 2002/0177735 A1 | 11/2002 | Kanamori et al. |
| 2003/0073571 A1 | 4/2003 | Heijden et al. |
| 2004/0074759 A1 | 4/2004 | Purta et al. |
| 2004/0074760 A1 | 4/2004 | Portnoff et al. |
| 2004/0077485 A1 | 4/2004 | Purta et al. |
| 2005/0202965 A1 | 9/2005 | Cavalcanti et al. |
| 2005/0274065 A1 | 12/2005 | Portnoff et al. |
| 2006/0096893 A1 | 5/2006 | DeAlmeida et al. |
| 2007/0087933 A1 | 4/2007 | Purta et al. |
| 2007/0202335 A1 | 8/2007 | Kubota |
| 2008/0233020 A1 | 9/2008 | Purta et al. |
| 2008/0262114 A1 | 10/2008 | Reynhout |
| 2008/0302703 A1 | 12/2008 | Purta et al. |

OTHER PUBLICATIONS

Heung, L.K. and Wicks, G.G., "Silica-Embedded Metal Hydrides", Journal of Alloys and Compounds, 293-295 (1999), pp. 446-451.

US 9,663,728 B2

GROUP 13-15 INTERSTITIAL METAL HYDRIDE CATALYSTS AND ASSOCIATED PROCESSES

This application which is a division of U.S. patent application Ser. No. 12/948,312, filed Nov. 17, 2010, claims the benefit of priority under 35 U.S.C. 120 from patent application Ser. No. 12/948,312 and from U.S. Provisional Patent Application No. 61/281,964, filed Nov. 24, 2009.

FIELD OF THE INVENTION

The present invention relates to the processing of hydrocarbon-containing feedstreams in the presence of an interstitial metal hydride comprised of at least one chemical element selected from Groups 3-11 (including the lanthanides, atomic numbers 58 to 71), and at least one chemical element selected from Groups 13-15 from the IUPAC Periodic Table of Elements. These interstitial metal hydrides, their catalysts and processes using these interstitial metal hydrides and catalysts of the present invention improve overall hydrogenation, product conversion, as well as sulfur reduction in hydrocarbon feedstreams.

DESCRIPTION OF RELATED ART

As the demand for hydrocarbon-based fuels has increased, the need for improved processes for desulfurizing hydrocarbon feedstreams has increased as well as the need for increasing the conversion of the heavy portions of these feedstreams into more valuable, lighter fuel products. These hydrocarbon feedstreams include, but are not limited to, whole and reduced petroleum crudes, shale oils, coal liquids, atmospheric and vacuum residua, asphaltenes, deasphalted oils, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, raffinates, biofuels, and mixtures thereof.

Hydrocarbon streams boiling above 430° F. (220° C.) often contain a considerable amount of large multi-ring hydrocarbon molecules and/or a conglomerated association of large molecules containing a large portion of the sulfur, nitrogen and metals present in the hydrocarbon stream. A significant portion of the sulfur contained in these heavy oils is in the form of heteroatoms in polycyclic aromatic molecules, comprised of sulfur compounds such as dibenzothiophenes, from which the sulfur is difficult to remove.

The high molecular weight, large multi-ring aromatic hydrocarbon molecules or associated heteroatom-containing (e.g., S, N, O) multi-ring hydrocarbon molecules in heavy oils are generally found in a solubility class of molecules termed as asphaltenes. A significant portion of the sulfur is contained within the structure of these asphaltenes or lower molecular weight polar molecules termed as "polars" or "resins". Due to the large aromatic structures of the asphaltenes, the contained sulfur can be refractory in nature and can be difficult to remove. In conventional refining processes, sulfur compounds are removed in refinement processes from various hydrocarbon streams by "cracking" the petroleum oils in the presence of a metal catalyst and hydrogen. These conventional refining processes for sulfur removal from hydrocarbon streams, by such names as "hydrodesulfurization" processes or "hydrocracking" processes, are well known in the industry. In these catalytic processes, the sulfur-containing hydrocarbon streams are contacted with catalysts containing hydrogenation metals, typically belonging to Groups 6, 8, 9 and 10 of the Periodic Table (based on the 1990 IUPAC system wherein the columns are numbered from 1 to 18) and in the presence of hydrogen at elevated temperatures and pressures to promote molecular cracking and heteroatom removal.

In these processes, the sulfur atoms in the hydrocarbon streams are exposed or separated from the oil and are able to react with hydrogen which is then liberated from the process typically in the form of a hydrogen sulfide gas. In these processes, nitrogen is also removed to some extent from the hydrocarbon streams (i.e., "denitrogenation") and metals (i.e., "demetalization") are also removed to some extent from the hydrocarbon streams. However, sometimes, nitrogen and/or metals are targeted for removal by "preprocessing" the hydrocarbon streams and removing a portion of the nitrogen and/or metals (which may include some amount of reaction cracking and/or desulfurization) prior to contacting the primary hydrodesulfurization or hydrocracking catalysts. Additionally, in these hydrodesulfurization or hydrocracking processes, some of the larger hydrocarbon molecules are "cracked" into smaller hydrocarbon molecules. This is generally called "cracking" or "conversion" and is a significant part of many of these hydroprocessing processes as this converts heavier, low value petroleum streams, such as gas oils and resids, into higher value products such as transportation fuels, for example, gasolines, jet fuels, and diesels.

However, a major problem facing the industry is that in these processes, a hydrocarbon stream is contacted at relatively high temperatures (typically at least 200 to 300° C. and higher) and pressures generally in excess of about 400 psig, and commonly in excess of 1000 psig or even 2500 psig. Hydrogen is commonly utilized in these processes, typically in the range of about 350 to about 2200 psia hydrogen partial pressure. These severe conditions (i.e., high pressures and temperatures) under which these processes operate result in high energy costs as well as significant capital equipment costs being associated with both the construction and operation of these units. Additionally, elevated safety concerns of these operations also result in highly specialized and costly safety, environmental and mitigation controls being associated with these operations. What is needed by the industry is a process which can achieve comparable hydrodesulfurization and/or conversion of petroleum oils at less severe operating conditions than the conventional hydroprocessing processes in the art.

An alternative modification to conventional hydroprocessing has been proposed in U.S. Pat. Nos. 7,157,401 and 7,387,712 to Purta et al, which are herein incorporated by reference. In particular, these patents disclose three specific compositions of iMeHs disclosed as Cat 100 (or "$AT_5$ type"), CAT 200 (or "$A_2T_{14}B$ type") and CAT 300 (or "$A_2T$ type"). However, better interstitial metal hydrides (iMeHs) and catalysts incorporating iMeH materials and associated processes are needed in the art to make hydroprocessing of hydrocarbon streams economically attractive and feasible.

SUMMARY OF THE INVENTION

The current invention embodies interstitial metal hydrides ("iMeH"), interstitial metal hydride catalysts and processes using these interstitial metal hydrides associated catalysts for hydroprocessing a hydrocarbon-containing feedstream to produce a product stream with improved product qualities by utilizing these iMeH comprising at least one chemical element selected from Groups 3 through 11 (including the lanthanides, atomic numbers 58 to 71), and at least one chemical element selected from Groups 13 through 15. Unless otherwise noted herein, all chemical element groupings referenced to herein are based on the 1990 IUPAC Periodic Table of Elements system in which the columns are assigned numbers (or "Groups") 1 to 18.

These "improved product qualities" of the processes herein include, but or not limited to increased hydrogenation (or increased hydrogen content by weight), conversion or "cracking to a lower average boiling point conversion, higher API gravity, reduced viscosity, as well as lowered levels of sulfur, nitrogen and metals. The current processes utilize new interstitial metal hydrides (or "iMeH(s)") comprising Group 13-15 elements, which iMeH catalysts have unexpectedly shown improved hydrodesulfurization and hydrogenation performance over the interstitial metal hydrides of the prior art.

In preferred embodiments of the present invention, the hydroprocessing catalysts herein are comprised of at least one chemical element selected from Groups 3-11 (including the lanthanides, atomic numbers 58 to 71), and at least one chemical element selected from Groups 13-15. This class of novel iMeHs will be collectively referred to herein as the "Group 13-15 iMeHs". In other preferred embodiments, a mixture of a Group 13-15 iMeH and a hydrocarbon feedstream are subjected to process conditions of least 200 psig pressure at a process temperature of at least 150° C. In other more preferred embodiments, a mixture of a Group 13-15 iMeH and a hydrocarbon feedstream are subjected to process conditions of least 400 psig pressure at a process temperature of at least 200° C. In all process embodiments herein, preferably the Group 13-15 iMeH and the hydrocarbon feedstream are also contacted under the conditions wherein the hydrogen partial pressure in the process is at least 150 psia.

In even more preferred embodiments, the Group 13-15 iMeH and a hydrocarbon feedstream are subjected microwave or radio frequency energy while under process conditions of least 400 psig at a process temperature of at least 200° C.

In even more preferred embodiments of the present invention, the Group 13-15 iMeHs, catalysts and/or co-catalysts of the current invention described herein are contacted with a hydrocarbon feedstream under hydroprocessing conditions wherein the hydrogen partial pressure in the process is at least 350 psia and at least 200° C., and even more preferably at least 400 psia and at least 250° C.

A preferred embodiment of the present invention is an interstitial metal hydride comprising at least a first chemical element selected from Groups 3-11 (including the lanthanides, atomic numbers 58 to 71), and at least a second chemical element selected from Groups 13-15 of the IUPAC Periodic Table of Elements. In a more preferred embodiment, the second chemical element is selected from aluminum, gallium, indium, thallium, germanium, tin, lead, antimony and bismuth; and even more preferably, the second chemical element is selected from indium, tin and antimony. Preferably, the second chemical element selected from Groups 13 through 15 is present in the interstitial metal hydride in an amount of from 0.1 to 10 wt % based on the total weight of the interstitial metal hydride.

In yet another preferred embodiment of the present invention the interstitial metal hydride further comprised of a third chemical element selected from Groups 3-11 (including the lanthanides, atomic numbers 58 to 71). In an even more preferred embodiment, the interstitial metal hydride is further comprised of a chemical element selected from Groups 6-11 of the IUPAC Periodic Table of Elements.

In yet another preferred embodiment of the present invention, is a catalyst comprised of the interstitial metal hydrides of the present invention containing at least one Group 13-15 chemical element, wherein the catalyst is further comprised of a matrix comprised of a material selected from alumina, silica, titania, zirconia, and combinations thereof. In a more preferred embodiment, the catalyst is further comprised of at least one transition metal element selected from Mo, W, Fe, Co, Ni, Pd, and Pt.

A preferred embodiment of the present invention is a process for upgrading hydrocarbon feedstreams comprising the steps of:
  a) contacting a hydrocarbon feed stream with a catalyst comprised of an interstitial metal hydride at process reaction conditions of at least 150° C. and at least 200 psig; and
  b) obtaining an upgraded reaction product stream;
wherein the interstitial metal hydride is comprised of at least a first chemical element selected from Groups 3-11 (including the lanthanides, atomic numbers 58 to 71), and at least a second chemical element selected from Groups 13-15 of the IUPAC Periodic Table of Elements.

In a more preferred embodiment of this process, the second chemical element is selected from aluminum, gallium, indium, thallium, germanium, tin, lead, antimony and bismuth; and even more preferably, the second chemical element is selected from indium, tin and antimony. In another preferred embodiment of the process, the interstitial metal hydride is further comprised of a third chemical element selected from Groups 3-11 (including the lanthanides, atomic numbers 58 to 71).

DETAILED DESCRIPTION OF THE INVENTION

The current invention embodies new catalyst and processes utilizing these catalysts for hydroprocessing a hydrocarbon-containing feedstream to produce a product stream with improved product qualities by utilizing an interstitial metal hydride ("iMeH") comprised of at least one chemical element selected from Groups 3-11 (including the lanthanides, atomic numbers 58 to 71), and at least one chemical element selected from Groups 13-15. These iMeHs of the present invention will be collectively referred herein to as "Group 13-15 iMeHs". These improved product qualities include, but are not limited to, increased hydrogenation (or increased hydrogen content by weight), lower average boiling point conversion (or "cracking"), higher API gravity, reduced viscosity, and lower levels of sulfur, nitrogen, and metals. Processing embodiments of the invention herein utilizing these new "Group 13-15 iMeHs" have unexpectedly shown improved hydrocarbon conversion performance over similar interstitial metal hydrides that do not contain a Group 13, 14 or 15 element.

The terms "high pressure/high severity" and "severe" hydroprocessing conditions and/or processes are equivalents as utilized herein and are defined as hydroprocessing processes wherein a hydrocarbon feedstream is contacted with a hydroprocessing catalyst in the presence of hydrogen under process conditions of at least 400 psig and at least 200° C.

It should be noted here that the terms "hydrocarbon-containing stream", "hydrocarbon stream" or "hydrocarbon feedstream" as used herein are equivalent and are defined as any stream containing at least 75 wt % hydrocarbons. These hydrocarbon feedstreams may be comprised of either "petroleum-based hydrocarbons", "biofuel hydrocarbons", or combinations thereof. The "petroleum-based hydrocarbons" are hydrocarbons obtained or derived hydrocarbonaceous materials from geological formations such as, but not limited to, crude oils, and oils derived from coal, tar sands, or bitumens, as well as any intermediate hydrocarbon or final hydrocarbon product derived from these sources. These are generally considered as non-renewable hydrocarbon sources.

As used herein, the terms "heavy hydrocarbon" or "heavy hydrocarbon stream" are equivalent and are defined herein as a subset of "petroleum-based hydrocarbons" and include hydrocarbon-containing streams containing at least 75 wt % hydrocarbons and having an API gravity of less than 20. Preferred heavy hydrocarbon streams for use in the present invention include, but are not limited to low API gravity, high sulfur, high viscosity crudes; tar sands bitumen; liquid hydrocarbons derived from tar sands bitumen, coal, or oil shale; as well as petrochemical refinery heavy intermediate fractions, such as atmospheric resids, vacuum resids, and other similar intermediate feedstreams and mixtures thereof containing boiling point materials above about 343° C. (650° F.). Heavy hydrocarbon streams may also include a blend of the hydrocarbons listed above with lighter hydrocarbon streams for control of certain properties for transport or sale, such as, but not limited to fuel oils and crude blends.

As used herein, the term "biofuel hydrocarbons" or "biofuels" are equivalent and are a sub-set of hydrocarbon streams, and are defined as hydrocarbon-containing streams wherein at least 50 wt % of the hydrocarbon material in the hydrocarbon-containing stream is derived from renewable biomass resources. These biomass resources include any plant or animal derived organic matter, such as dedicated energy crops and trees, agricultural food and feed crops, agricultural crop wastes and residues, wood wastes and residues, aquatic plants, algae, fungi, plant oils, animal oils, animal tissues, animal wastes, municipal wastes, and other waste materials. Biofuels may include, but are not limited to hydrocarbons in the middle distillate range, diesels, kerosenes, gasoline, gasoline fractions, biodiesel, biojet fuel, biogasolines and combinations thereof.

As used herein, the term "plant oil" is a subset of biofuels and is defined as a hydrocarbon-containing material derived from plant sources, such as agricultural crops and forest products, as well as wastes, effluents and residues from the processing of such materials. Plant oils may include vegetable oils. Examples of plant oils may include, but are not limited to, canola oil, sunflower oil, soybean oil, rapeseed oil, mustard seed oil, palm oil, corn oil, soya oil, linseed oil, peanut oil, coconut oil, corn oil, olive oil, and combinations thereof.

As used herein, the term "animal oil" is a subset of biofuels and is defined as a hydrocarbon-containing material derived animal sources, as well as wastes, effluents and residues from the processing of such materials. Examples of animal oils may include, but are not limited to, animal fats, yellow grease, animal tallow, pork fats, pork oils, chicken fats, chicken oils, mutton fats, mutton oils, beef fats, beef oils, and combinations thereof.

As utilized herein, the terms "interstitial metal hydride" or "iMeH" are equivalents and these terms as utilized herein are defined as materials that are composed of alloyed metals combined with atomic hydrogen, wherein the atomic hydrogen is stored interstitially within the metal alloy matrix.

This matrix of the interstitial metal hydride can have a crystalline or amorphous structure. The iMeH is especially suited to accommodating monatomic hydrogen that is extracted from molecular hydrogen. The quantity of atomic hydrogen in the interstitial metallic hydrides has a measurable value, which is a function of alloy composition, and operating temperature and pressure. In an iMeH, the ratio of hydrogen to metal atoms may vary over a range and may not be expressible as a ratio of small whole numbers. The iMeH compounds of the present invention are able to dissociate diatomic hydrogen molecules at the surface into monatomic hydrogen, absorb copious amounts of monatomic hydrogen thus produced into the metal alloy, and desorb the monatomic hydrogen under the appropriate conditions. A heat of absorption is produced when the molecular hydrogen dissociates into atomic hydrogen and the hydrogen atoms position themselves interstitially in the structure of the material. Additional energy at a suitable steady state process temperature and pressure is required for the release of monatomic hydrogen from within the catalyst. This energy can be derived from the process heat of reaction or from external application of energy or both.

Interstitial metal hydrides are produced by preparing samples of the constituent metals in the desired proportions, and combining them and heating them so that they melt together homogeneously to produce a metal alloy. The resulting metal alloy is then exposed to hydrogen at a temperature and pressure characteristic of the alloy so that the metal alloy takes up the hydrogen in monatomic form.

The iMeH materials of the present invention are typically prepared by a volumetric (gas to solid alloy) method at a known temperature and pressure using a stainless steel reactor. The metallic hydride will absorb hydrogen with an exothermic reaction. This hydrogenation process is reversible according to the following chemical reaction schematic:

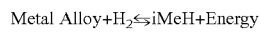
Metal Alloy+H$_2$⇌iMeH+Energy

As noted, the hydrogen absorption is accompanied by an exothermic/endothermic exchange of energy. Hydrogen uptake/release is also accompanied by volume expansion/contraction of the iMeH which under certain conditions can be high as about 20 to 25 vol %. During this process, hydrogen atoms will occupy interstitial sites in the alloy lattice. This hydrogen absorption/desorption by an iMeH can be measured and characterized in a Pressure-Composition-Temperature ("PCT") plot or graph.

The metal alloy from which an iMeH is produced can be prepared by mechanical or induction heated alloying processes. The metal alloy can be stoichiometric or hyper-stoichiometric. Hyper-stoichiometric compounds are compounds that exhibit wide compositional variations from ideal stoichiometry. Hyper-stoichiometric systems contain excess elements, which can significantly influence the phase stability of the metallic hydrides. The iMeH is produced from a metal alloy by subjecting the alloy to hydrogen at a pressure and temperature that is a characteristic of the particular alloy.

in the current invention, iMeHs comprising Group 13, Group 14, Group 15 elements, and combinations thereof, have been found to have improved hydroprocessing capabilities. Preferred embodiments of the Group 13-15 iMeHs are as follows.

An embodiment of the present invention is an interstitial metal hydride ("iMeH") comprised at least one chemical element selected from Groups 3-11 (including the lanthanides, atomic numbers 58 to 71), and at least one chemical element selected from Groups 13 through 15 of the IUPAC Periodic Table of Elements.

In preferred embodiments of the present invention is an interstitial metal hydride ("iMeH") comprised at least one chemical element selected from Groups 3-11 (including the lanthanides, atomic numbers 58 to 71), and at least one chemical element selected from Groups 13 through 15; wherein the chemical element selected from Groups 13 through 15 is present in an amount of from 0.1 to 10 wt % based on the total weight of the interstitial metal hydride. Even more preferably, the chemical element selected from Groups 13 through 15 is present in the interstitial metal hydride in an amount of from 1 to 5 wt % based on the total weight of the interstitial metal hydride.

Another embodiment of the present invention is an interstitial metal hydride ("iMeH") comprised at least one chemical element selected from Groups 3-11 (including the lanthanides, atomic numbers 58 to 71), and a Group 13 element. Another embodiment of the present invention is an interstitial metal hydride ("iMeH") comprised at least one chemical element selected from Groups 3-11 (including the lanthanides, atomic numbers 58 to 71), and a Group 14 element. Another embodiment of the present invention is an iMeH comprised at least one chemical element selected from Groups 3-11 (including the lanthanides, atomic numbers 58 to 71), and a Group 15 element. Another embodiment of the present invention is an iMeH comprised at least one chemical element selected from Groups 3-11 (including the lanthanides, atomic numbers 58 to 71), and at least one chemical element selected from aluminum, gallium, indium, thallium, germanium, tin, lead, antimony and bismuth. Another preferred embodiment of the present invention is an iMeH comprised at least two chemical elements selected from Groups 3-11 (including the lanthanides, atomic numbers 58 to 71), and at least one chemical element selected from aluminum, gallium, indium, thallium, germanium, tin, lead, antimony and bismuth.

Another preferred embodiment of the present invention is an interstitial metal hydride ("iMeH") comprised at least one chemical element selected from Groups 3-11 (including the lanthanides, atomic numbers 58 to 71), and at least one chemical element selected from indium, tin and antimony. Another preferred embodiment of the present invention is an iMeH comprised at least two chemical elements selected from Groups 3-11 (including the lanthanides, atomic numbers 58 to 71), and at least one chemical element selected from indium, tin and antimony.

Another preferred embodiment of the present invention is all interstitial metal hydride ("iMeH") comprised at least one Group 4 chemical element, at least one chemical element selected from Group 5, and at least one chemical element selected from Groups 13-15; more preferably, the Group 4 chemical element is selected from zirconium and titanium, and the Group 5 element is vanadium. An even more preferred embodiment is described by the prior sentence wherein the Groups 13-15 element is selected from aluminum, gallium, indium, thallium, germanium, tin, lead, antimony and bismuth; and most preferably wherein the Groups 13-15 element is selected from indium, tin and antimony.

Another preferred embodiment of the present invention is an interstitial metal hydride ("iMeH") comprised at least one Group 4 chemical element, at least one chemical element selected from Group 5, at least one chemical element selected from Groups 6-11, and at least one chemical element selected from Groups 13-15; more preferably, the Group 4 chemical element is selected from zirconium and titanium, and the Group 5 element is vanadium; even more preferably, the Groups 6-11 element is selected from chrome (Cr), manganese (Mn), iron (Fe), cobalt (Co), and nickel (Ni). An even more preferred embodiment is described by the prior sentence wherein the Groups 13-15 element is selected from aluminum, gallium, indium, thallium, germanium, tin, lead, antimony and bismuth; and most preferably wherein the Groups 13-15 element is selected from indium, tin and antimony.

Another preferred embodiment of the present invention is an interstitial metal hydride ("iMeH") comprised at least two Group 4 chemical elements and at least one chemical element selected from Groups 13-15; more preferably, the first Group 4 chemical element is zirconium and the second Group 4 chemical element is selected from titanium and hafnium. An even more preferred embodiment is described by the prior sentence wherein the Groups 13-15 element is selected from aluminum, gallium, indium, thallium, germanium, tin, lead, antimony and bismuth; and most preferably wherein the Groups 13-15 element is selected from indium, tin and antimony.

Another preferred embodiment of the present invention is an interstitial metal hydride ("iMeH") comprised at least two Group 4 chemical elements, at least one chemical element selected from Groups 6-11, and at least one chemical element selected from Groups 13-15; more preferably, the first Group 4 chemical element is zirconium and the second Group 4 chemical element is selected from titanium and hafnium; even more preferably, the Groups 6-11 element is selected from chrome (Cr), manganese (Mn), iron (Fe), cobalt (Co), and nickel (Ni). An even more preferred embodiment is described by the prior sentence wherein the Groups 13-15 element is selected from aluminum, gallium, indium, thallium, germanium, tin, lead, antimony and bismuth; and most preferably wherein the Groups 13-15 element is selected from indium, tin and antimony.

In all of the interstitial metal hydride ("iMeH") embodiments of the present invention above, the iMeH comprising Groups 13-15 elements can be stoichiometric or hyper-stoichiometric. In all of the iMeH embodiments of the present invention above, the iMeH comprising Groups 13-15 elements can be made by a stoichiometric or hyper-stoichiometric substitution of one of the base metal elements in the iMeH for the Group 13-15 element.

The Group 13-15 iMeHs of the present invention can be utilized by themselves as the active catalyst or as a co-catalyst with additional catalytic materials. By the term "co-catalyst" as used herein, it is meant that the iMeH component is either made into a catalyst particle along with additional catalytic elements(s), or alternatively, one catalyst particle can be comprised of the Group 13-15 iMeH component and mixed with a separate catalyst particle comprised of the additional catalytic elements(s). Preferred catalytic elements include, but are not limited to Group 6, 8, 9 and 10 elements. More preferred catalytic elements for use with the Group 13-15 iMeHs of the present invention are Mo, W, Fe, Co, Ni, Pd, Pt, and combinations thereof. The even more preferred catalytic elements for use with the Group 13-15 iMeHs of the present invention are Mo, W, Co, Ni, and combinations thereof. In a most preferred embodiment, the co-catalyst is comprised of a high severity hydroprocessing iMeH of the present invention and Mo. In another most preferred embodiment, the co-catalyst is comprised of a Group 13-15 iMeH of the present invention, Mo, and either Co, Ni or a combination thereof. In the present invention, the "co-catalysts", and their use, are a preferred embodiment.

The Group 13-15 iMeHs of the present invention can be combined with known hydroprocessing catalysts such as noble metals, metal oxides, metal sulfides, zeolitic acid or base sites to further promote hydroprocessing of feedstocks such as organic compounds. These iMeH materials can be combined with other hydroprocessing materials in a variety of ways to build an optimized catalyst for a particular reaction or function. In general, the finer the powders being mixed (e.g. support, iMeH), the higher the surface area and the more intimate the mixing. It is important in the processing steps is to minimize the exposure of iMeH to oxygen and/or water vapor at elevated temperatures (above 25° C.) for extended periods of time. Exposure can be minimized by use of desiccants and by blanketing atmospheres of inert gases such as nitrogen and argon. Preferably, the iMeH is not calcined or subjected to an oxidizing environment at elevated temperatures.

The Group 13-15 iMeH can be used in a powder, extrudate, or preformed matrix form based upon the type of reactor design selected (e.g., fluidized bed, fixed bed, catalytic monolith, etc.). The simplest Group 13-15 iMeH hydroprocessing catalyst is the iMeH powder itself. In this case the iMeH provides monatomic hydrogen and is the catalyst for hydroprocessing. The iMeH, when used in powder form, may be mixed and dispersed within the feedstock and transported through a reactor (e.g. slurry reactor). After the desired reaction has been catalyzed in the reactor, the iMeH powder can then separated from the reaction products for reuse.

The Group 13-15 iMeH can be combined with a support and optionally other catalytic elements to produce a composite catalyst. The support provides for the physical dispersion of iMeH, providing greater surface area and ease of handling. The support also serves to increase the surface area of the active catalytic elements and thereby increase the process reaction rates. The support can also add acidic or basic sites that can enhance the catalytic activity of other catalyst components or acts as catalysts themselves. The support also serves to disperse the metallic or metal oxide catalytic sites so as to prevent arcing in the presence of a strong electric or magnetic fields that may be used to expedite catalytic action. The Group 13-15 iMeH hydroprocessing catalyst may further comprise a radio frequency or microwave absorber in thermal contact with the interstitial metal hydride. These absorbers are preferably added metal elements or metal compounds with a high dielectric constant.

The Group 13-15 iMeHs of the present invention can be utilized in a crystalline or amorphous form. The support may be composed of an inorganic oxide, a metal, a carbon, or combinations of these materials. In preferred embodiments of the present invention, the support (or matrix) is comprised of alumina, silica, titania, zirconia, or combinations thereof. In a more preferred embodiment, the matrix is comprised of a zeolite, preferably, MCM-41. The iMeH phases and catalytic elements can be dispersed as mechanically mixed powders, or can be chemically dispersed, impregnated or deposited. When mixed powders are used in the present invention, the powder particle size is controlled to provide a powder that has particles that are small enough to provide suitable surface area and reactivity, but not so fine as to produce significant surface oxidation. Other catalytic elements included in the co-catalyst or catalyst systems of the present invention may be noble metals such as platinum or palladium, Group 6, 8, 9 and 10 metal oxides and/or metal sulfides, and zeolite acid or base sites. A hydroprocessing component and a hydrocracking component used in combination with the Group 13-15 iMeH may be one or more of these catalytic elements. Both the combination of an iMeH powder with a support, which can provide an additional catalyst function (i.e. at catalytically active or inert support), or an iMeH dispersed onto a hydroprocessing catalyst powder, can be especially effective for hydrocracking in a fluidized bed or ebullating bed reactor.

The hydrogen atoms occupy interstitial sites in the alloy lattice of the iMeH and the ratio of hydrogen to metal atoms may vary over a range and may not be expressible as a ratio of small whole numbers. The iMeH compounds of the present invention are also able to dissociate diatomic hydrogen molecules at the surface into monatomic hydrogen (i.e., hydrogen atoms), absorb significant amounts of monatomic hydrogen thus produced, and subsequently desorb a portion of the stored monatomic hydrogen under the appropriate conditions.

Regardless of how the Group 13-15 iMeH is incorporated into the catalyst or co-catalyst, it is important that the iMeH be limited in its exposure to either air and/or water as the iMeH is prone to forming a strong oxide layer when exposed to oxygen sources. This oxygen layer can create a significant barrier on the iMeH surface which limits the transfer of monatomic hydrogen between the feed environment and the iMeH crystal lattice. Exposure to oxygen and water can be minimized by surrounding the catalyst with a blanketing atmosphere such as nitrogen or argon that is pure or has been treated by a dryer or desiccant to remove water content. These inert atmospheres should be utilized in the fabrication, transportation, and reactor loading sequences of the operation to minimize oxidation of the catalysts.

Example 1 herein describes how the iMeHs used in the comparative examples were made. Two catalysts of the present invention were also made with the following compositions.

CAT 401=$ZrV_2$+5 wt % Sn

CAT 402=$ZrV_2$+5 wt % Sb

Additionally, a zirconium-vanadium ($ZrV_2$) iMeH that did not contain either a Group 13, 14, or 15 element was made as a comparative material for the testing.

In Example 2 herein, each of the three (3) iMeH samples above were tested under the same hydroprocessing conditions of 200 psig and 280° C. The data is presented as the relative first order rate constant based on the disappearance of reactants for each of the model compounds dibenzothiophene, diethyl-dibenzothiophene (4,6-diethyl-dibenzothiophene), and dodecyl-naphthalene (1-n-dodecylnaphthalene) in a model compound mixture. These model compounds were used to represent difficult to convert polynuclear species found within a typical heavy oil feedstream.

The first order rate constant data obtained has been normalized to shown the relative first order rate constant. The relative first order rate constants as shown in Tables 1A and 1B are based on the actual first order rate constant for each model compound for each iMeH tested divided by the actual first order rate constant for each model compound for the CAT 400 iMeH (i.e., $ZrV_2$ iMeH not containing a Group 13, 14, or 15 element) being used a "standard". Therefore, all of the relative first order rate constants for each compound for CAT 400 are valued at 1.00 and all relative first order rate constants for each compound for the other iMeHs shown are relative to CAT 400.

The details of these tests are presented in Example 2. The results from these tests are presented in Table 1A (iMeH in unsulfided condition) and Table 1B (iMeH in sulfided condition).

TABLE 1A

Relative First Order Rate Constants for Model Compounds Unsulfided iMeH (at 400 psig and 200° C.)

| iMeH Catalyst Composition | Relative First Order Rate Constant (Dibenzothiophene) | Relative First Order Rate Constant (Diethyl-Dibenzothiophene) | Relative First Order Rate Constant (Dodecyl-Naphthalene) |
|---|---|---|---|
| CAT 400 (ZrV$_2$) | 1.0 | 1.0 | 1.0 |
| CAT 401 (ZrV$_2$ + Sn) | 9.1 | 5.8 | 3.3 |
| CAT 402 (ZrV$_2$ + Sb) | 2.3 | 1.8 | 1.9 |

TABLE 1B

Relative First Order Rate Constants for Model Compounds Sulfided iMeH (at 400 psig and 200° C.)

| iMeH Catalyst Composition | Relative First Order Rate Constant (Dibenzothiophene) | Relative First Order Rate Constant (Diethyl-Dibenzothiophene) | Relative First. Order Rate Constant (Dodecyl-Naphthalene) |
|---|---|---|---|
| CAT 400 (ZrV$_2$) | 1.0 | 1.0 | 1.0 |
| CAT 401 (ZrV$_2$ + Sn) | 0.9 | 2.0 | 2.4 |
| CAT 402 (ZrV$_2$ + Sb) | 1.0 | 2.3 | 1.9 |

For continuous flow operation units as used in commercial practice, a greater relative first order rate constant translates into higher capacities for given process equipment sizes, or can result in smaller required equipment and lower operating costs.

The first order rate constant is calculated by the formula:

First Order Rate Constant=space velocity×ln(reactant concentration in feed/reactant concentration in the product)

As can be seen in Table 1A, the representative iMeHs of the present invention (CAT 401 containing tin, and CAT 402 containing antimony) have significantly higher first order rate constants as compared to a similar composition iMeH that does not contain a Group 13, 14, or 15 element (designated as CAT 400), when in the unsulfided condition.

Similarly, as can be seen in Table 1B, with the exception of the dibenzothiophene model compound, the representative iMeHs of the present invention (CAT 401 containing tin, and CAT 402 containing antimony) have significantly higher first order rate constants as compared to a similar composition iMeH that does not contain a Group 13, 14, or 15 element (designated as CAT 400), when in the sulfided condition.

Although a representative catalyst with a Group 13 element included was not specifically tested herein, it is believed by the inventors herein that similar improvement in hydroprocessing activity would result from the use of a Group 13 element. In particular, it is believed that indium would be a particularly useful chemical additive to the iMeH composition.

The addition of the Group 13-15 elements as per the present invention can result in substantially better hydroprocessing capabilities than their comparative base iMeH (ZrV$_2$). It is seen from Table 1B that the CAT 401 iMeH (Sn-containing) showed an over a 900% relative conversion rate of dibenzothiophene over the comparative ZrV$_2$ iMeH, as well as significant improvements over the comparative ZrV$_2$ iMeH for conversion of the other model compounds and compound mixture when in the unsulfided condition.

While not as startling in the results as the CAT 401 iMeH, the CAT 402 iMeH (Sb-containing) still showed an approximate 200% relative conversion rate of all three (3) of the model compounds (dibenzothiophene, diethyl-dibenzothiophene, and dodecyl-naphthalene) over the comparative ZrV$_2$ iMeH when tested in the unsulfided condition.

Similarly, in reviewing Table 1B, an approximate 200% relative conversion rate of the most difficult sulfur containing species tested (diethyl-dibenzothiophene) as well as an approximate 200% relative conversion rate in hydrogenation capability (dodecyl-naphthalene) was experienced for the representative CAT 401 and CAT 402 iMeHs of the present invention over the comparative ZrV$_2$ iMeH when tested in the sulfided condition.

In preferred embodiment of the present invention, the ratio of the first order rate constant of an interstitial metal hydride composition with an additional element selected from Group 13-15 elements (per the present invention) to the first order rate constant of the comparative interstitial metal hydride composition without the additional Group 13-15 element is at least 200% (when expressed as a percentage) as measured in the sulfided or unsulfided condition under hydroprocessing conditions of 280° C. and 200 psig for at least one model compound selected from dibenzothiophene, diethyl-dibenzothiophene (4,6-diethyl-dibenzothiophene), and dodecyl-naphthalene (1-n-dodecylnaphthalene). In a more preferred embodiment of the present invention, the ratio of the first order rate constant of an interstitial metal hydride composition with an additional element selected from Group 13-15 elements (per the present invention) to the first order rate constant of the comparative interstitial metal hydride composition without the additional Group 13-15 element is at least 300% (when expressed as a percentage) as measured in the unsulfided condition under hydroprocessing conditions of 280° C. and 200 psig for at least one model compound selected from dibenzothiophene, diethyl-dibenzothiophene (4,6-diethyl-dibenzothiophene), and dodecyl-naphthalene (1-n-dodecyl-naphthalene). In a most preferred embodiment of the present invention, the ratio of the first order rate constant of an interstitial metal hydride composition with an additional element selected from Group 13-15 elements (per the present invention) to the first order rate constant of the comparative interstitial metal hydride composition without the additional Group 13-15 element is at least 500% (when expressed as a percentage) as measured in the unsulfided condition under hydroprocessing conditions of 280° C. and 200 psig for at least one model compound selected from dibenzothiophene, diethyl-dibenzothiophene (4,6-diethyl-dibenzothiophene), and dodecyl-naphthalene (1-n-dodecyl-naphthalene).

In preferred process embodiments of the present invention, the Group 13-15 iMeHs are utilized in a hydroprocessing process wherein the operating (or "reaction") conditions are at least 200 psig and at least 150° C. More preferred reaction conditions are at least 400 psig and at least 200° C.; and even more preferably at least 600 psig and at least 250° C. Preferred hydrogen partial pressures are at least about 150 psia; more preferably at least about 350 psia; and even more preferably at least about 500 psia. Most preferably the reaction conditions are within the operating envelope of about 200° C. to about 450° C. with an operating pressure of from about 400 psig to about 2500 psig. As described above, the Group 13-15 iMeHs may be utilized in all processes disclosed herein as either the iMeH itself as the catalyst or the iMeH may be incorporated as a co-catalyst with additional active catalytic materials and utilized in the processes herein. In all embodiments herein, the iMeH may be utilized in the sulfided or unsulfided condition.

In a preferred embodiment of the present invention, a hydrocarbon stream and/or the heavy hydrocarbon stream containing at least 1 wt % sulfur and more preferably at least 3 wt % sulfur is contacted with a catalyst or co-catalyst containing a Group 13-15 iMeH in the presence of hydrogen at a process temperature of at least 200° C. and a process pressure of at least 400 psig. In other preferred embodiments of the present invention, the hydrocarbon stream and/or the heavy hydrocarbon stream that is desulfurized in the present process contains polycyclic sulfur heteroatom complexes which are difficult to desulfurize by conventional methods.

Although not required for the use of the present invention, the catalytic activity of the Group 13-15 iMeH-containing co-catalysts of the present invention can be enhanced and controlled by exposing the catalyst to radio frequency ("RF") energy (about $3\times10^5$ Hz to about $3\times10^8$ Hz) or microwave energy (about $3\times10^8$ Hz to about $3\times10^{12}$ Hz), either in the absence of, the presence of, or in sequence with conventional fuel fired heating or resistive heating. The RF or microwave energy can provide for a significant increase in hydroprocessing efficiency in comparison to conventional heating. Furthermore the microwave energy can be modulated and controlled in such a manner as to optimize the reaction exchange of the monatomic hydrogen from the iMeH. In one embodiment of the invention, the Group 13-15 iMeH component is placed in contact with a separate absorber of RF or microwave energy. The separate absorber of RF or microwave energy absorbs the energy and transfers it to the iMeH through thermal conduction or convection, and may be one or more compounds such as silicon carbide, iron silicide, nickel oxide, and tungsten carbide. In another embodiment of the invention, the Group 13-15 iMeH component functions as the primary absorber of RF or microwave energy. When used with microwave enhancement, the Group 13-15 iMeH component is sufficiently dispersed within the catalyst and feedstock combination to solve the problem of hot spots and arcing generally associated with the introduction of metals into a microwave or RF field.

The selective use of RF or microwave energy to drive the catalytic component of the catalyst aids in the release of the iMeH monatomic hydrogen into the feedstock. It is cost effective to maximize the use of fossil fuels to pre-heat the feedstocks to near reaction temperatures, and use minimum RF or microwave energy to drive and control the hydroprocessing reactions. Ideally there will be a minimized or zero net temperature increase from the RF or microwave energy into the catalyst support or into the feedstock because this energy is primarily targeted into the iMeH to enhance the reaction exchange of monatomic hydrogen. Selective coupling of the RF or microwave energy is accomplished through selection and control of the relative dielectric parameters of the catalyst's components and the feedstock. This results in efficient, economically viable catalytic processes, which are enhanced using microwaves.

The Group 13-15 iMeHs and/or associated co-catalysts of the present invention can be used in any hydroprocessing process. The term "hydroprocessing" (or equivalent term "hydrotreating") as used herein is a general term and is defined as all catalytic processes involving hydrogen. This includes the reaction of any petroleum fraction with hydrogen in the presence of a catalyst. This includes processes which remove undesirable impurities such as sulfur, nitrogen, metals, and unsaturated compounds in the presence of hydrogen and a catalyst. Examples include, but are not limited to, hydrogenation, hydrocracking, hydrodesulfurization, hydrodenitrogenation hydrodemetalization, and catalytic hydrodewaxing.

Specific hydroprocessing processes wherein the Group 13-15 iMeHs and/or associated co-catalysts of the present invention can be utilized include, but are not limited to the following processes as defined:

The term "hydrogenation" as used herein is defined as any process wherein a hydrocarbon feedstream is contacted with a catalyst and hydrogen at an elevated pressure and temperature wherein hydrogen is chemically added to at least a portion of the hydrocarbon compounds in the hydrocarbon feedstream, thereby increasing the hydrogen content of the hydrocarbon compounds. Preferred hydrogenation applications include the hydrogen addition to "unsaturated" olefinic or aromatic hydrocarbon compounds (e.g., olefin hydrogenation or aromatic hydrogenation). Hydrogenation is a subset of hydroprocessing processes.

The term "hydrocracking" as used herein is defined as any process wherein a hydrocarbon feedstream is contacted with a catalyst and hydrogen at an elevated pressure and temperature wherein at least a portion of the hydrocarbon feedstream is converted into lower-boiling point products thereby resulting in an overall lower average boiling point product stream based on wt %. Hydrocracking is a subset of hydroprocessing processes.

The term "hydrodesulfurization" or "HDS" as used herein is defined as a process in which a hydrocarbon feedstream is contacted with a catalyst and hydrogen at an elevated pressure and temperature wherein at least a portion the sulfur elements or compounds present in hydrocarbon feedstream are removed thereby resulting in at least one hydrocarbon product with a lower sulfur content than the hydrocarbon feedstream. Hydrodesulfurization is a subset of hydroprocessing processes.

The term "hydrodenitrogenation" or "HDN" as used herein is defined as a process in which a hydrocarbon feedstream is contacted with a catalyst and hydrogen at an elevated pressure and temperature wherein at least a portion the nitrogen elements or compounds present in hydrocarbon feedstream are removed thereby resulting in at least one hydrocarbon product with a lower nitrogen content than the hydrocarbon feedstream. Hydrodenitrogenation is a subset of hydroprocessing processes.

The term "hydrodemetalization" or "HDM" as used herein is defined as a process in which a hydrocarbon feedstream is contacted with a catalyst and hydrogen at an elevated pressure and temperature wherein at least a portion the metal elements or compounds present in hydrocarbon feedstream are removed thereby resulting in at least one hydrocarbon product with a lower metal content than the hydrocarbon feedstream. Hydrodemetalization is a subset of hydroprocessing processes.

The term "catalytic hydrodewaxing" as used herein is defined as a catalytic hydrocracking process which uses molecular sieves, preferably zeolites, to selectively hydrocrack and/or isomerize waxes (i.e., long chain paraffinic molecules with greater than about 22 carbon molecules) present in the hydrocarbon streams to smaller carbon content molecules thereby resulting in an overall lower average boiling point product stream based on wt %. Catalytic hydrodewaxing is a subset of hydroprocessing processes.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

EXAMPLES

Example 1

This example describes how the CAT 400, CAT 401 and CAT 402 interstitial metal hydrides ("iMeHs") of the Examples herein were fabricated and prepared. These catalysts were utilized for the performance testing described in Example 2 herein.

Chemical Composition of Tested Materials

The chemical compositions of the iMeHs tested in the Examples were as follows:

CAT 400=$ZrV_2$

CAT 401=$ZrV_2$+5 wt % Sn

CAT 402=$ZrV_2$+5 wt % Sb

Sample Preparation for the CAT 400, CAT 401, and CAT 402 iMeHs

The metal alloys were prepared by melting together the appropriate stoichiometric amounts of metals with purity of 99.9% (from Alfa Aesar/Johnson Matthey Company™) in an argon atmosphere using water cooled copper hearth argon arc furnace Model CENTORR® from Centorr Vacuum Industries™, Nashua, N.H. Each arc-melted ingot was flipped over and re-incited three times and was normally held in the liquid state for approximately 30 seconds to insure complete mixing of the starting materials. The reduction in the sample weight was negligible.

To obtain single phase materials the cast samples were sealed in quartz tubes, filled with ⅓ atmosphere of argon gas and annealed at 950° C. for a period of 3 to 5 days using a Thermo scientific Lindberg/Blue™ tube furnace. The samples in the tubes were water quenched to avoid a possible phase transition during the cooling process.

The crystal structure of the CAT 400 samples was determined by powder X-ray diffraction. The crystal structure was determined to be cubic Laves phase C15 ($MgCu_2$) type for $ZrV_2$ alloys.

Sample Preparation and Activation

The metal alloy was crushed manually to an average particle size of approximately 200 μm (microns). The hard alloy samples were milled mechanically at cryogenic temperatures (approximately 80° K) and then were attrited. All samples were sieved to under approximately 200 μm (microns).

All particle size preparations of the samples were performed under inert nitrogen atmosphere conditions. The average particle size distribution was obtained using Horiba Laser-La-920® Particle Analyzer, from HORIBA Instruments™, Inc., Irvine, Calif.

Approximately 4 to 5 grams of the metal alloy powder sample was placed into the stainless steel reactor connected to the manual hydrogenation unit. The reactor was purged with hydrogen three times. Hydrogen gas (with purity of 99.999%) was introduced to the sample chamber at room temperature and pressure up to 600 psig. A waiting period of about 30 to 60 minutes was given to observe if any absorption takes place. If no absorption occurred, then for $H_2$ surface activation, the temperature was raised slowly (5 C per minutes) to about 250° C. The temperature needed to activate the sample depends on the active surface of the alloy. The sample starts absorbing hydrogen which is an exothermic process. The hydrogen activated sample is then cooled down to ambient temperature and pressure to achieve maximum hydrogen absorption. The sample was recycled for hydrogen absorption and desorption for two times to insure fully homogenized powder with saturated hydrogen.

Example 2

This Example was used to test, calculate and compare the relative first order rate constants of the iMeH samples from Example 1.

Here, the three (3) iMeHs from Example 1 were tested in both the non-sulfided (or "unsulfided") and sulfided conditions with model compounds under similar severe hydroprocessing conditions of 200° C. and 400 psig. The testing in this example was performed according to the following procedures.

Hydrotreating Activity of the Non-Sulfided Interstitial Metal Hydrides

The reactor testing unit consisted of a multi-well, high-pressure batch reactor that holds 48×3 mL alumina vials. The vials are covered with a plate containing 48 pinholes to allow gas flow into and out of the vials, but limit liquid losses. The iMeH and feed loading and unloading were done in a glove box under nitrogen. The iMeH was added in 32.5 microliter increments to 1.5 mL of feed to simulate space velocity. Mixing was accomplished with an orbital shaker at 300 rpm. Feeds containing each of three (3) model compounds were used for catalyst activity evaluation. The three (3) feed mixtures were all poly alpha olefin based (PAO, 6 centistokes) and the three mixtures were spiked with 0.3 wt % dibenzothiophene (DBT), 0.3 wt % 4,6-diethyl-dibenzothiophene (DEDBT), and 1 wt % 1-n-dodecylnaphthalene (C12N), respectively.

Each reactor was purged with nitrogen and then hydrogen prior to activity testing. The reaction gas was 100% hydrogen. Activity testing was conducted at 280° C. and 200 psi, and held at those conditions for approximately 23 hrs. After which the reactor was cooled to room temperature and purged with nitrogen. Products were removed from the vials and subject to GC analysis.

The relative first order rate constants were then calculated from the results for each of the unsulfided iMeH samples tested for each of the model compounds (with CAT 400 being used as the relative standard) and the results are presented in Table 1A, herein. The relative first order rate constants as shown in Table 1A are based on the actual first order rate constant for each model compound for each iMeH tested divided by the actual first order rate constant for each model compound for the CAT 400 iMeH being used the "standard". Therefore, all of the relative first order rate constants for each model compound for CAT 400 are valued at 1.00 and all relative first order rate constants for each compound for the other iMeHs are shown relative to CAT 400.

Hydrotreating Activity of the Sulfided Interstitial Metal Hydrides

The sulfided iMeH samples were run similarly to the non-sulfided samples described above in this example with the following differences. The iMeH samples were pre-treated in nitrogen at 150° C. for 1 hr. The iMeH were then sulfided at two stages, i.e., 250° C. for 2 hrs, and 360° C. for another 2 hrs. 10% $H_2S$ balanced with $H_2$ was used for sulfiding the iMeH samples. After sulfiding, the iMeHs were cooled down to 25° C. under hydrogen flow. Once at room temperature, the iMeHs were pressurized to 500 psig to ensure hydrogen content was at full capacity. The reactor was then purged with nitrogen for another 1.5 hrs before additions of the model feeds. The reaction gas consisted of 1 wt % $H_2S$ in $H_2$.

The relative first order rate constants were then calculated from the results for each of the sulfided iMeH samples tested for each of the model compounds (with CAT 400 being used as the relative standard) and the results are presented in Table 1B, herein. The relative first order rate constants as shown in Table 1B are based on the actual first order rate constant for each model compound for each iMeH tested divided by the actual first order rate constant for each model compound for the CAT 400 iMeH being used the "standard". Therefore, all of the relative first order rate constants for each compound for CAT 400 are valued at 1.00 and all relative first order rate constants for each model compound for the other iMeHs are shown relative to CAT 400.

What is claimed is:

1. A process comprising the steps of:
   a) contacting a hydrocarbon feedstream with a catalyst comprised of an interstitial metal hydride in the presence of hydrogen at process reaction conditions of at least 150° C. and at least 200 psig; and
   b) obtaining an upgraded reaction product stream;
   wherein the interstitial metal hydride is comprised of at least a first chemical element selected from Groups 3-11 (including the lanthanides, atomic numbers 58 to 71), and at least a second chemical element selected from indium, tin and antimony.

2. The process of claim 1, wherein process reaction conditions are from about 200° C. to about 450° C. and from about 400 psig to about 2,500 psig.

3. The process of claim 1, wherein step a) is performed in the presence of hydrogen with a hydrogen partial pressure of at least 150 psia.

4. The process of claim 1, wherein the catalyst is further comprised of at least one transition metal element selected from Groups 6, 8, 9, and 10 of the IUPAC Periodic Table of Elements.

5. The process of claim 4, wherein the transition metal element is selected from the group consisting of Mo, W, Co, and Ni.

6. The process of claim 1, wherein the interstitial metal hydride is further comprised of a third chemical element selected from Groups 3-11 (including the lanthanides, atomic numbers 58 to 71).

7. The process of claim 6, wherein the interstitial metal hydride is further comprised of a fourth chemical element selected from Groups 6-11 of the IUPAC Periodic Table of Elements.

8. The process of claim 6, wherein the ratio of the first order rate constant of the interstitial metal hydride to the first order rate constant of a comparative interstitial metal hydride composition without the second chemical element is at least 200% as measured in either the sulfided or unsulfided condition under hydroprocessing conditions of 280° C. and 200 psig for at least one model compound selected from dibenzothiophene, diethyl-dibenzothiophene (4,6-diethyl-dibenzothiophene), and dodecyl-naphthalene (1-n-dodecyl-naphthalene).

9. The process of claim 6, wherein the ratio of the first order rate constant of the interstitial metal hydride to the first order rate constant of a comparative interstitial metal hydride composition without the second chemical element is at least 300% as measured in the unsulfided condition under hydroprocessing conditions of 280° C. and 200 psig for at least one model compound selected from dibenzothiophene, diethyl -dibenzothiophene (4,6-diethyl- dibenzothiophene), and dodecyl-naphthalene (1-n-dodecylnaphthalene).

10. The process of claim 1, wherein the first chemical element of the interstitial metal hydride is selected from the Group 4 chemical elements, and the interstitial metal hydride is further comprised of a chemical element selected from Group 5 of the IUPAC Periodic Table of Elements.

11. The process of claim 10, wherein the Group 4 chemical element is selected from zirconium and titanium, and the Group 5 element is vanadium.

12. The process of claim 1, wherein the first chemical element of the interstitial metal hydride is selected from a first Group 4 chemical element, and the interstitial metal hydride is further comprised of a second Group 4 chemical element of the IUPAC Periodic Table of Elements.

13. The process of claim 12, wherein the first Group 4 element is zirconium and the second Group 4 element is selected from titanium and hafnium.

14. The process of claim 1, wherein the process reaction conditions are at least 200° C. and at least 400 psig, and the hydrogen partial pressure during the process reaction is at least 350 psia.

15. The process of claim 1, wherein the hydrocarbon feedstream and interstitial metal hydride are further subjected to radio frequency energy or microwave frequency energy while under the reaction conditions.

16. The process of claim 1, wherein the hydrocarbon feedstream is a heavy hydrocarbon feedstream with an API gravity of less than 20 and a sulfur content of at least 1 wt % sulfur.

17. The process of claim 1, wherein the hydrocarbon feedstream is comprised of a biofuel.

18. The process of claim 17, wherein the hydrocarbon feedstream substantially consists of a biofuel.

19. The process of claim 1, wherein the process is a hydroprocessing process selected from hydrocracking, hydrodesulfurization, hydrodenitrogenation, hydrodemetalization, and catalytic hydrodewaxing processes.

20. The process of claim 19, wherein the hydroprocessing process is a hydrogenation process and at least a portion of the hydrocarbon compounds in the hydrocarbon feedstream are increased in hydrogen content.

21. The process of claim 19, wherein the hydroprocessing process is a hydrodesulfurization process and the upgraded reaction product stream has a lower sulfur content by wt % than the hydrocarbon feedstream.

22. The process of claim 21, wherein the upgraded reaction product stream further has a lower average boiling point based on wt % than the hydrocarbon feedstream.

23. The process of claim 19, wherein the hydroprocessing process is a hydrocracking process and the upgraded reaction product stream has a lower average boiling point based on wt % than the hydrocarbon feedstream.

* * * * *